(12) United States Patent
Cadoret et al.

(10) Patent No.: US 7,991,847 B2
(45) Date of Patent: Aug. 2, 2011

(54) METHOD AND SYSTEM FOR MANAGING THE ORDER OF MESSAGES

(75) Inventors: Marion Cadoret, Biot (FR); Agnes Penaud, Mouans-Sartoux (FR); David Poulouin, Antibes (FR)

(73) Assignee: Amadeus S.A.S., Sophia Antipolis Cedex (FR)

( * ) Notice: Subject to any disclaimer, the term of this patent is extended or adjusted under 35 U.S.C. 154(b) by 12 days.

(21) Appl. No.: 12/560,951

(22) Filed: Sep. 16, 2009

(65) Prior Publication Data

US 2010/0293235 A1 Nov. 18, 2010

(30) Foreign Application Priority Data

May 18, 2009 (EP) ..................... 09305450

(51) Int. Cl.
*G06F 15/16* (2006.01)
(52) U.S. Cl. ......... 709/206; 709/207; 709/223; 709/224
(58) Field of Classification Search .......... 709/206–207, 709/223–224, 238, 242
See application file for complete search history.

(56) References Cited

U.S. PATENT DOCUMENTS

| | | | | | |
|---|---|---|---|---|---|
| 5,459,454 | A | * | 10/1995 | Nakano | 358/402 |
| 5,848,228 | A | * | 12/1998 | Simatic et al. | 709/238 |
| 6,292,857 | B1 | * | 9/2001 | Sidoroff et al. | 710/54 |
| 7,240,097 | B2 | * | 7/2007 | Holdsworth et al. | 709/207 |
| 2003/0158883 | A1 | * | 8/2003 | Drudis et al. | 709/226 |
| 2004/0230662 | A1 | * | 11/2004 | Estrada et al. | 709/207 |
| 2006/0146848 | A1 | * | 7/2006 | Kirstein et al. | 370/412 |
| 2007/0118601 | A1 | | 5/2007 | Pacheco | |
| 2007/0124398 | A1 | * | 5/2007 | Parkinson et al. | 709/206 |

FOREIGN PATENT DOCUMENTS

| | | |
|---|---|---|
| EP | 2 254 046 A1 | 11/2010 |
| WO | WO 2004/081749 A2 | 9/2004 |
| WO | WO 2007/062510 A1 | 6/2007 |

OTHER PUBLICATIONS

European Search Report for European Application No. 09 30 5450 (Oct. 29, 2009).

* cited by examiner

*Primary Examiner* — Philip B Tran
(74) *Attorney, Agent, or Firm* — Jenkins, Wilson, Taylor & Hunt, P.A.

(57) ABSTRACT

A method of ordering a plurality of messages received from a sender to be sent to a receiver in a sequence based on the dependency of one message on one or more other messages, the method comprising the steps of: receiving one or more messages from a stream of messages and storing them in a database; identifying a characteristic (P-Key-Order) of each message which is common to a group of messages; identifying a message dependency for the messages in the group of messages from a parameter of the message; reviewing a particular stored message in the database to determine if the stored message can be sent by; determining whether the stored message is dependent on a previous message and determining a status of the previous message; updating the status of the stored message based on the status of the previous message; sending the stored message after acknowledgement that the previous message has been sent.

12 Claims, 12 Drawing Sheets

| ID | P_Key | i | j | Status | Dep_Id | Message |
|---|---|---|---|---|---|---|
| 9 | AAAAAA | 0 | 1 | S | ∅ | M0(1) |
| 10 | AAAAAA | 0 | 2 | S | ∅ | M0(2) |
| 11 | AAAAAA | 1 | 1 | V | ∅ | ∅ |
| 12 | AAAAAA | 1 | 2 | N | 10 | M1(2) |
| 13 | AAAAAA | 2 | 1 | N | 9 | M2(1) |
| 14 | AAAAAA | 2 | 2 | D | 12 | M2(2) |
| 15 | AAAAAA | 3 | 1 | D | 13 | M3(1) |
| 16 | BBBBBB | 2 | 1 | U | ∅ | M'2(1) |

*Fig. 9*

METHOD AND SYSTEM FOR MANAGING THE ORDER OF MESSAGES

RELATED APPLICATION

This application claims the benefit of European patent application no. EP09305450.0 filed May 18, 2009, the entire disclosure of which is herein incorporated by reference.

FIELD OF THE INVENTION

The present invention relates to a method and system for managing the order of messages, particularly but not exclusively in respect of the sequencing of messages to external systems in a multiple processor environment.

BACKGROUND OF THE INVENTION

Messaging systems exist in a multitude of different domains and are formulated in a multitude of different ways. The messages often relate to other messages that have either gone before or are yet to come, in other words there is often a sequence to the messages. Due to the manner in which many messaging systems now work, it is not uncommon for messages to be received at a central processing environment out of sequence. This is particularly the case in multiprocessor environments where processes can occur at different speeds, which leads to de-sequencing. These messages are then often required to be transmitted onwards to a destination. Some destinations are unable to cope with messages which are received out of sequence as they then fail to process the messages properly.

There are many known messaging systems, which attempt to overcome some of the problems identified above. For example, WO 2007/062510 describes a system which uses a sequencer to process messages concurrently. The messages have a unique identifier and a sequence indicator. In this system, the conditions are such that it is possible to determine a priori a sequence identifier for the or each message. This facilitates the use of affinity: messages sharing the same sequence identifier are distributed by the same process. In WO2007/062510 the sequencing is managed by locking the messages in an outbound queue.

US 2007/0124398 discloses a multiprocessor environment where a system uses a combination of sequence identifier and sequence number to ensure that messages are processed by the same resource. This method requires threads of waiting messages that require acknowledgements before they can be processed. There is also a choice of queue depending on the sequence number and the queues can be ordered.

US 2003/110230 discloses a parallel processing environment where the ordering of messages is preserved by processing messages from the same source with a common resource or common thread. Again this requires the use of waiting threads and processes or an ordered queue of messages for onward transmission.

The above-mentioned prior art methods work to some extent, although they are very dependent on queuing messages which leads to complexity and the use of large amounts of memory and processing power. The main issue with this system is maintenance and the fact that is it not always possible to have the sequencing based on a unique sequence correlation. The dependencies can be much more complicated than just the order of a sequence number within the same sequence identifier. The above methods work but suffer with problems of maintenance and reliability. Having a waiting thread in a memory is not persistent: so if a problem occurs on the machine the sequencing will be lost. Having the sequencing managed in ordered queues raises a problem of scalability. It is more difficult to add more queues, or there has to be affinity between processes and queues. Affinity is also more complex to manage. It adds a point of failure because there is no redundancy in terms of service. In addition, the prior art does not teach a centralized history, so it is not possible to handle complex sequencing. In other words, when there is no unique sequence identifier.

OBJECTS OF THE INVENTION

One aspect of the present invention is to overcome at least some of the problems associated with the prior art.

SUMMARY OF THE INVENTION

The present invention provides a method and system as set out in the accompanying claims.

According to one aspect of the present invention there is provided a method of ordering a plurality of messages received from a sender to be sent to a receiver in a sequence equivalent to a message order of the plurality of messages wherein the message order is determined in real time, the method comprising the steps of: receiving one or more messages from a stream of messages and storing them in a database; identifying a characteristic (P-Key-Order) of each message which is common to a group of messages; identifying a sequence which corresponds to the message order (1, 2, 3, 4 etc.) for the group of messages from a parameter of the message; reviewing a particular stored message in the database to determine if the stored message can be sent by; determining whether a previous message exists in the sequence before the stored message and determining a status of the previous message; updating the status of the stored message based on the status of the previous message; and sending the stored message in accordance with the sequence once the previous message has been sent.

The present invention provides a highly scalable system, which can be easily extended to cope with increased traffic. The present invention also guarantees that messages are sent in the right order in a multiprocessor environment. The dependencies of the messages are strictly those required. There is no dependency introduced by the system. The ordering is not total: messages that are independent can be sent in parallel. Thus, if one receiver link fails, it will not impact any other receiver unless the messages are functionally linked. In addition, using the right orders is very important as de-synchronization between different processors can lead to many problems. For example, in the airline environment if there are problems in relation to the synchronization of the messages, passengers could be denied the seat when in fact there is space available on the aircraft. This leads to a loss of money in the airline and other disadvantages as well.

The process in accordance with the present invention is provided by a simple implementation since threads and affinity do not form part of the process. In particular, there is no affinity between any queuing and processing elements of the system as they are not present. In addition, there is a flexible manner in which errors can be processed. This is particularly important when handling a missing message in a sequence. By using a database a full history of messages and transmissions are maintained for a specific window of time. The time window also provides a threshold. Before the threshold the message can be in one state and after the state can change. The threshold-is particularly useful for maintenance issues and for reducing the amount of space required to store messages and information associated therewith. In addition, queuing is minimized and scalability is made easier.

According to a second aspect of the present invention there is provided a message system for ordering a plurality of messages received from a sender to be sent to a receiver in a sequence equivalent to a message order of the plurality of messages, the method comprising the steps of: a receiving receiver module for receiving one or more messages from a stream of messages and storing them in a database; a message management module for identifying a characteristic (P-Key-Order) of each message which is common to a group of messages; for identifying a sequence which corresponds to the message order (1, 2, 3, 4 etc.) for the group of messages from a parameter of the message; and for reviewing a particular stored message in the database to determine if the stored message can be sent by: determining whether a previous message exists in the sequence before the stored message and determining a status of the previous message; and updating the status of the stored message based on the status of the previous message; a transmission module for sending the stored message in accordance with the sequence once the previous message has been sent.

BRIEF DESCRIPTION OF THE DRAWINGS

Reference will now be made, by way of example, to the accompanying drawings, in which:

FIG. 9 is a table of message dependencies, in accordance with an embodiment of the invention, given by way of example.

DETAILED DESCRIPTION OF THE PREFERRED EMBODIMENTS

Figure 1:
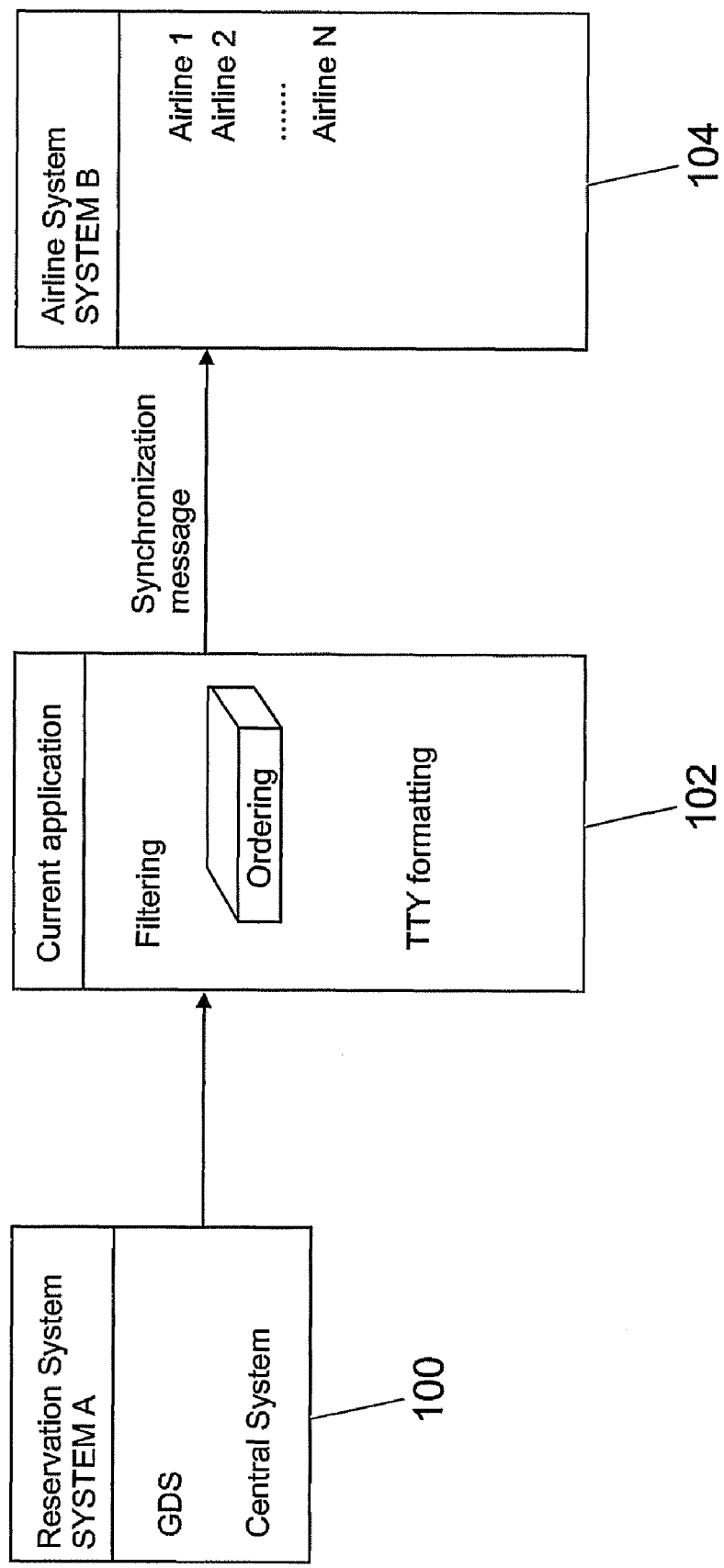
FIG. 1 is a simple representation of a system, in accordance with an embodiment of the invention, given by way of example.

At the highest level the present invention relates to ordering of messages from one system to another in order to guarantee synchronization. This is shown by way of example in FIG. 1. FIG. 1 shows a reservation system (system A) 100 which is connected to a message management module 102. The message management module manages the incoming messages as will be described in greater detail below, before sending synchronized messages to an airline system (System B) 104. The reservation system 100 may be of any appropriate type and includes by way of example a global distribution system (GDS) and other central resources of any other appropriate type. The reservation system may be operated by an online web process such as a browser, travel agents or any other appropriate body. The airline system 104 may be associated with one or many airlines. The message management module 102 includes a number of different processes such as filtering, ordering, formatting etc.

In any type of messaging system there may be a requirement for the messages to satisfy a particular sequencing need. This is particularly the case in an environment where customers are purchasing airline tickets from an appropriate client airline. In the case of the example of purchasing airline tickets the messages are referred to as passenger name records (PNR). A passenger name record includes all details of a specific trip for a passenger including extras and any additional services the passenger has requested, along with any changes or amendments to the trip which may occur.

Figure 2:
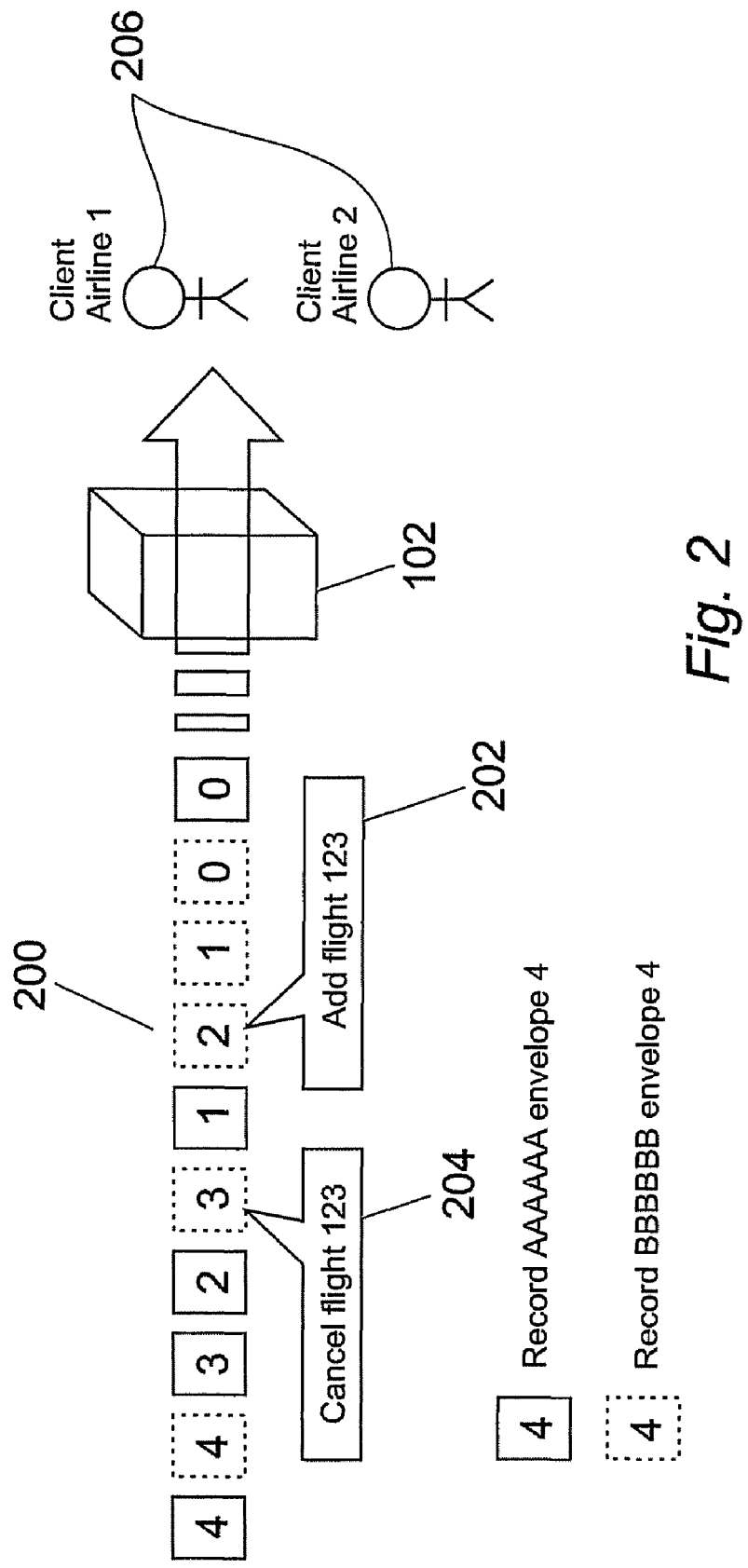
FIG. 2 is a representation of a normal case sequencing of messages, in accordance with an embodiment of the invention, given by way of example.

FIG. 2 shows an example of why message sequencing is important. FIG. 2 shows the message management module 102 and an incoming stream of messages 200. The stream of messages includes messages relating to two different records. Messages relating to the first record are represented by solid lines and messages relating to the second record are represented by dotted lines. For each record there is a particular sequence of messages represented by the numbers 0, 1, 2, 3 and 4. The sequence may be based on the order of creation of the messages although the order can be either absolute (0, 1, 2, 3, 4) or relative ((0,), (1, 0), (2,1), (4,2), . . . ).

If message 202 adds a flight to a particular record and message 204 cancels that same flight from the same record, the airline client 206 needs to receive message 202 before message 204 to make any sense of the sequence or content. If the airline client sees message 204 before message 202, the airline will be trying to cancel a flight that has not yet been booked according to the sequence of messages. The message management module 102 ensures that message 202 is received by the client airline 206 before message 204 irrespective of the order in which the messages arrive at the message management module. In other words, the message order is calculated "on the fly" without reference to the incoming order. This will now be described in greater detail below.

Figure 3:
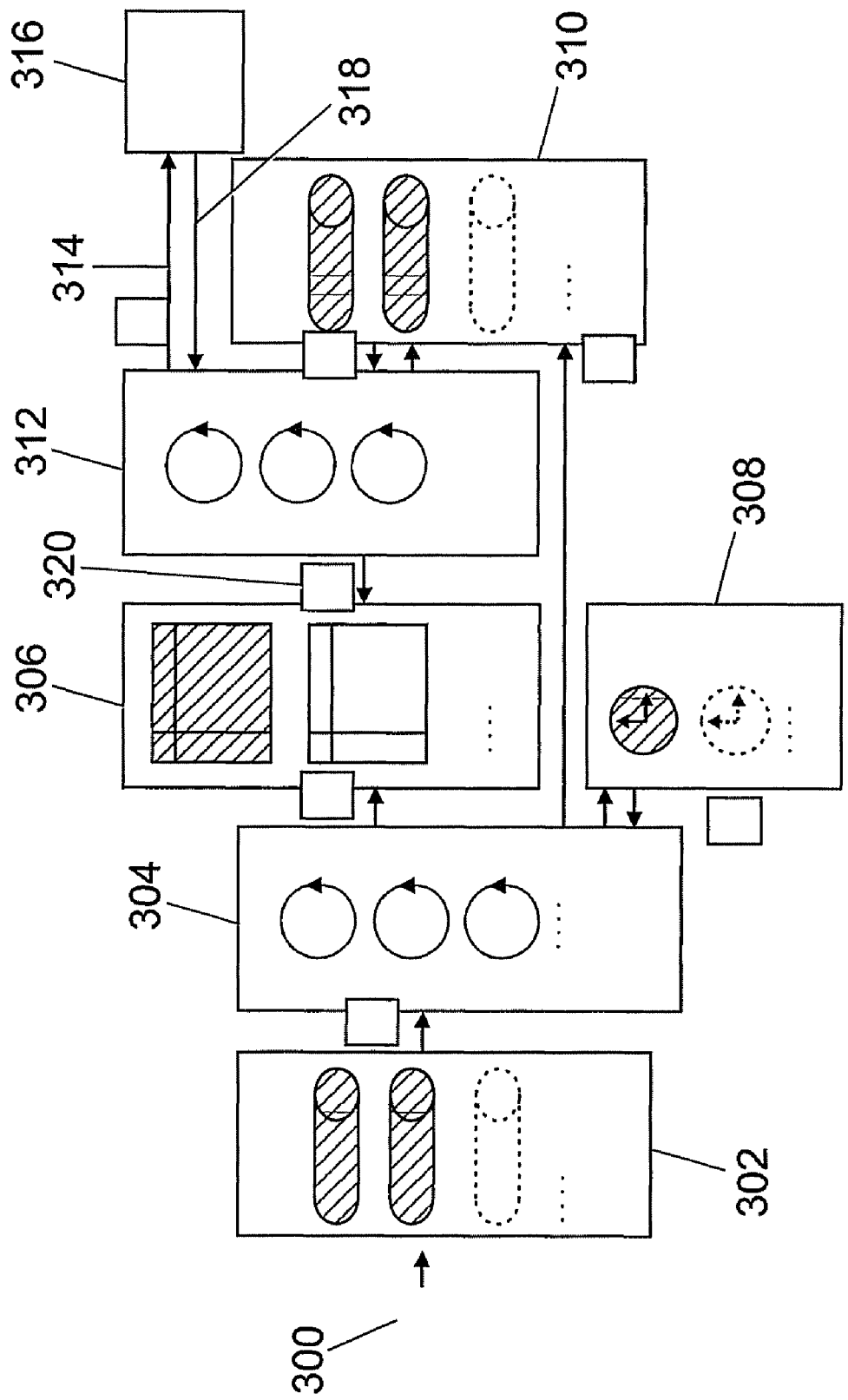
FIG. 3 is a detailed representation of the FIG. 1 system, in accordance with an embodiment of the invention, given by way of example.

Referring to FIG. 3, a more detailed diagram of the message management module is shown. The message management module receives an input Pi 300, which is generated into one or more input streams by an input stream module 302. The messages forming Pi may be in an undefined order due to parallel processing or other issues, although the messages are generated by a reliable system and it is assumed at present that no messages are lost. The input streams are then used by message generator module 304 to generate the messages included in the input stream. The messages are then stored in a storage module 306. The message generator module is also connected to a timer 308 and to an output stream module 310. The purpose of the timer is to ensure that after a given time period a given message will undergo reprocessing if other events have not given rise to this in advance. The output stream model 310 is connected to a message sending module 312 which outputs an output 314 to an external system 316.

Figure 8:
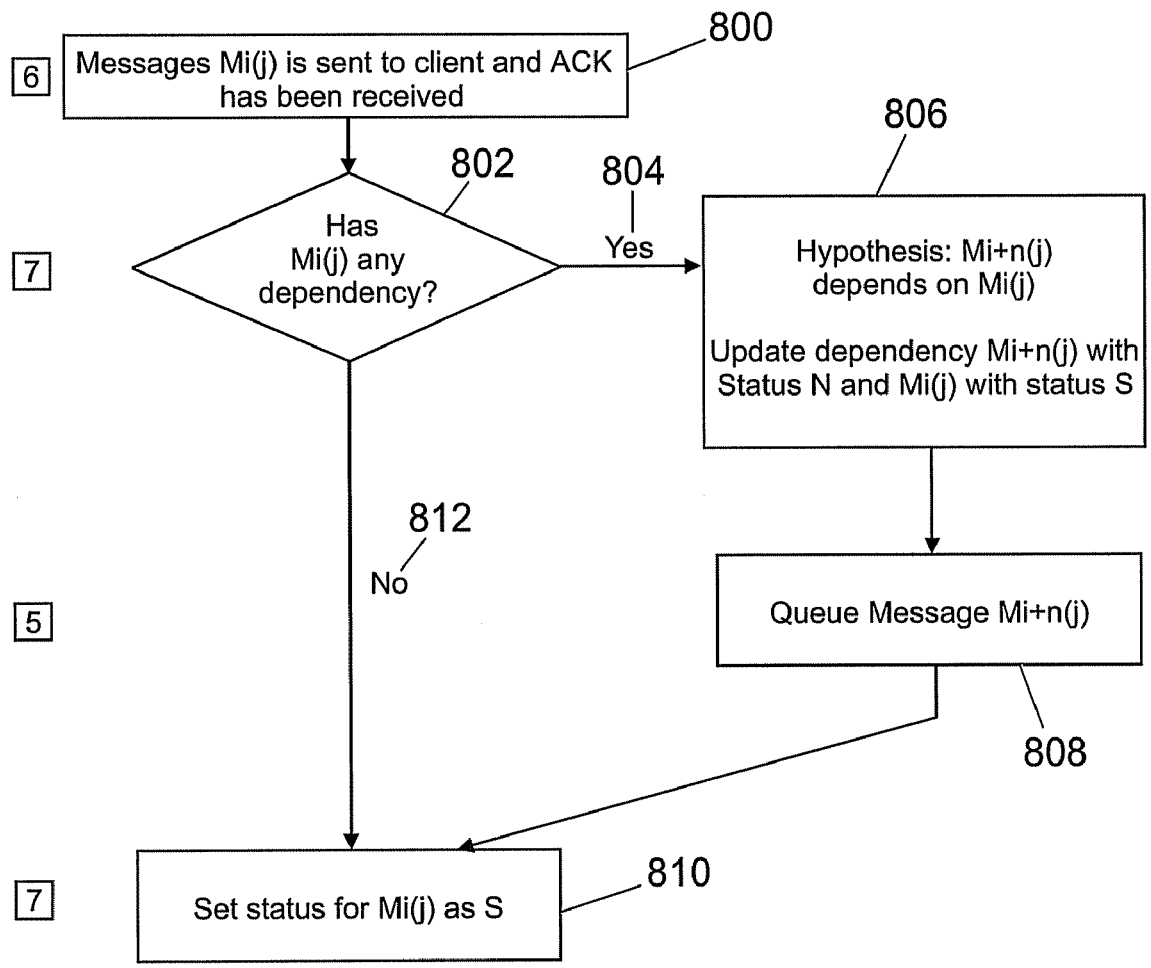
FIG. 8 is a flow chart showing the cascading and sequencing of a call-back, in accordance with an embodiment of the invention, given by way of example.

The message sending module is also capable of receiving an acknowledgement 318 from the external system 316 to indicate that the output (generally a particular message) has been received. The acknowledgement is passed back to the storage module as shown by arrow 320. The acknowledgement is used to determine which, if any, messages should be sent next. The numbers in boxes 1 to 7 correspond to steps in FIGS. 5 and 8; these will be described in greater detail below.

In order to more fully understand the process steps that will be described below, it is important to understand a number of key points associated with the messages: the nature and type of the messages themselves, their nomenclature and their relationship with other messages.

The invention deals with messages which have a dependency on one or more messages. A message that has a dependency with another is said to form part of a family of messages. In most cases messages will arrive at the message management module 102 in roughly the right order. However, in multi processing environments it is not uncommon for messages to be received out of order. This is one of the problems addressed by the present invention. When the message is ready to be sent it will be sent as quickly as possible, independent of any other message. This assumes that the message in question has been released as will be described below. When a message cannot be sent immediately there is generally a reason why this is the case. One possible reason is that a message in front of the message in question has not yet been received. An alternative reason is that the previous message has been sent and an acknowledgement has not yet been received. There may also be circumstances where the message order has not been fully determined; in this case messages may have to wait until the correct order is determined. In any situation where a message cannot be sent immediately, there may be an additional criterion (for example use of a timer) which determines the scheduling of the message in question. For example, if a previous message has not been received and there is a "hole in sequence number".

Figure 4:
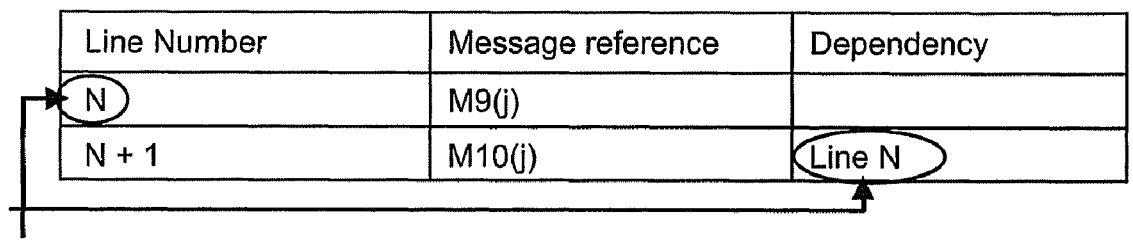
FIG. 4 is part of a table for identifying nomenclature used in accordance with an embodiment of the invention, given by way of example.

The messages employ a specific type of nomenclature. This is used in conjunction with various references and dependencies in a database to determine the order or sequence of the messages in the message management module. Referring to FIG. 4, certain aspects of the message nomenclature are now described. The table in FIG. 4 shows the line number in the database, a message reference and any dependency. The database shows two messages: M9($j$) and M10($j$). If message M10($j$) depends on M9($j$), then when an acknowledgement of reception of message M9($j$) is received, the process looks in the database to find any stored dependency lines depending on M9($j$) to determine if there is any dependency information. In this way line M10($j$) is identified. In the example, the line N+1 has a dependency on line N, thus once M9($j$) is acknowledged line N+1 (corresponding to M10($j$)) can now be sent.

Further nomenclature concerns the origin and destination of the messages. In this respect, "i" is the original sequence tag or index and "j" is the message target. A message generator sends messages denoted by Pi, where i denotes the order of the messages. Target j is not known when receiving a message in the system. The system related to the present invention receives messages Pi and generates messages Mi(j) where i is the order of the message (same as Pi) and j is the end-user that should receive message Mi(j), the end user is also known as target or client.

In the environment where it is assumed that no messages are lost, Pi leads to generation of messages Mi(1), Mi(2), ... Mi(n). Pi gives rise to a family of messages defined by a key P-Key-Order which is required to follow the order defined by i and by target or client j. The manner in which the messages may be sent is set out below. Families of messages P0, P1, P2 are received and it is assumed that there are two targets: j=0 and 1. Messages could be sent in one of the following orders M0(0), M0(1), M1(0), M1(1), M2(0), M2(1); or M0(0), M1(0), M0(1), M2(0), M1(1), M2(1). In either case the message order is respected as each target receives the messages in the correct order. There may be many other orders which would also be acceptable depending on the number of messages, targets etc. By way of example the following message sequence is incorrect for target 1 and correct for target 0 and 2: M1(1), M0(0), M1(0), M0(1), M2(0), M2(1). The method for ordering the messages will be described in greater detail below.

The present invention relates to the method and system for processing messages to ensure that they arrived at a target in the correct order. This is achieved by means of a sequencing process based on a software implementation and a database. The database is in the form of a persistent table, as described above, which contains historic data for carrying out the sequencing process as already described above. The historic data may include the following:
   an identification number (for example a line number);
   a key: P-Key-Order, e.g. AAAAAA; BBBBBB; etc.;
   a numerical sequence tag (i);
   a target (j);
   a dependence identifier DEP-id which enables cross referencing corresponding to an identification number of another line;
   a status field (for example, Mi(j) may be sent (S), or void (V) if there is no message for the target, or (D) as Dependant of another message, N as no dependant (=ready to be) and U for Unknown when the dependency has not yet been identified, as a corresponding message is missing;
   the generated message Mi(j);
   other data: for example warning messages for error handling etc., if required.

The above described example is based on the ideal situation where no messages are lost. In this situation messages may be delayed for as long as necessary to wait for dependent messages. If a message has no dependency it is allocated the status N. This means that the message has no dependency and can be immediately be queued for transmission to the external system. Once the message has been given the status N and is queued to be sent to the target, the status of the message can be set to S. The status S means the message has been successfully sent and that all messages that depend on this message can now be released. This means the subsequent messages will change status from D to N (in the relevant order) and be queued for outbound transmission in a cascading manner to the target.

In reality, some messages may be lost, particularly in complex systems and/or in the event of link problems, system crashes or whatever. In these circumstances, the method described above may be adapted to include any "best efforts" mechanism. An example of a best efforts mechanism is through the use of the timer 308 in FIG. 1.

The use of the timer or any equivalent reminder technique is an important part of the present invention. This is due to the fact that in multiprocessor architectures certain messages may be lost or delayed, which may upset the sequence of messages to be transmitted to the client. In order for messages which cannot be sent immediately to be re-treated, they must first be stored for a period of time. This allows new messages to be received at the message generator module 304 which may influence any delayed messages. After passing through the timer 308 the message is returned to the message generator module to be re-processed in accordance with the sequencing process (which is described below). If messages have been received whilst the delayed message has been in the timer a different status may be afforded to the delayed message and thus a different action may be possible. For example, the status may change, if a message has been received on which the delayed message is dependant. The message that potentially enters the timer is a new message which has not had a dependency determined. Any message in the timer will be reviewed for a status update (to D or N, for example). If there is no such status change the message will remain in the timer. The length of the delay can be tuned to the particular process and/or the number of messages being received over a certain time delay. The length of the delay may also be linked to the active window in the persistent table of the database. This active window is described in greater detail below with reference to FIG. 10.

At a certain point in time the delayed message may be sent, whatever the status thereof. In the alternative a decision to delete the message may occur, or another action may take place such as a warning being sent to a hotline etc. The precise outcome will depend on system settings and predetermined business logic.

Figure 5:
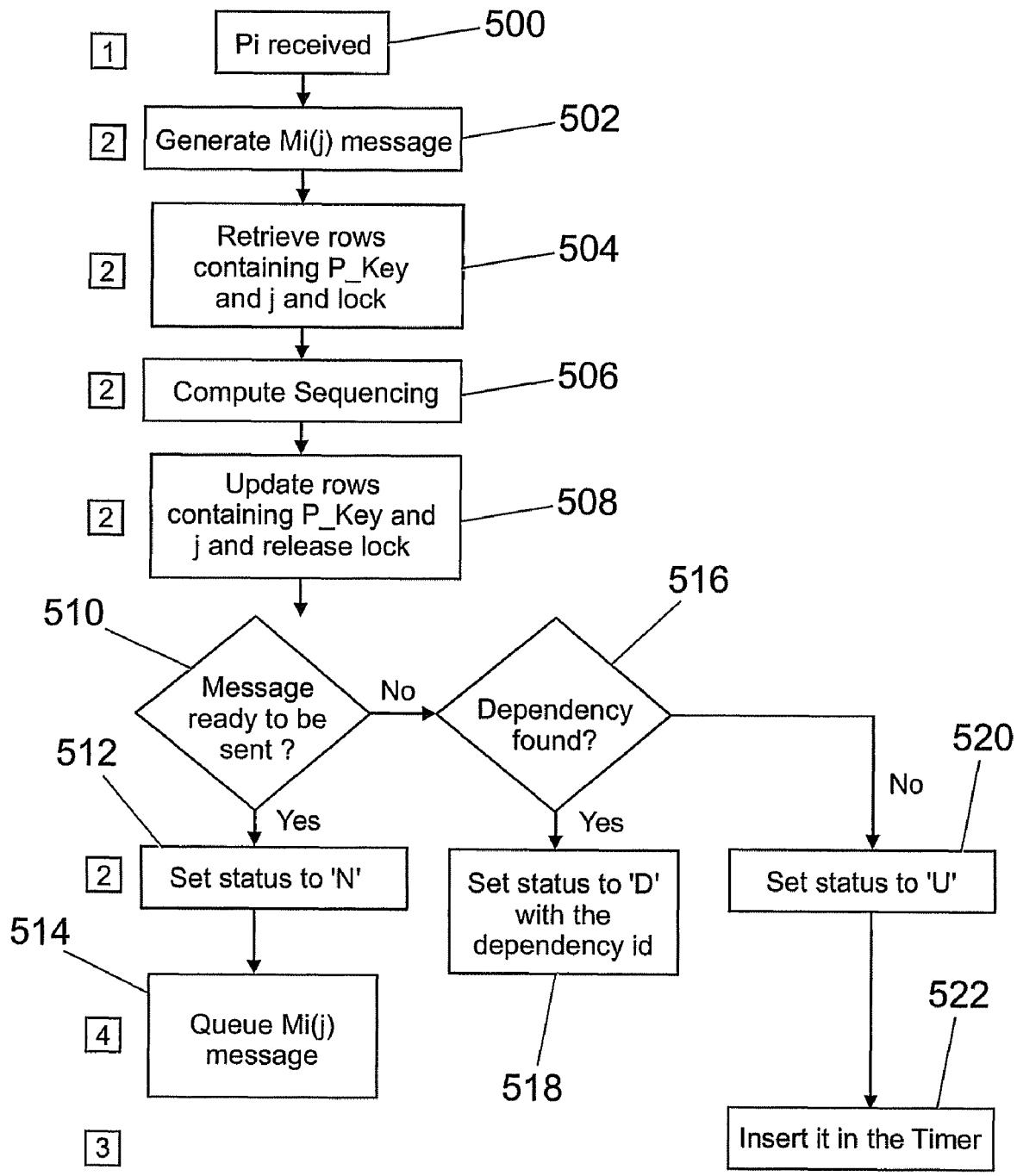
FIG. 5 is a flow chart showing the message generation, in accordance with an embodiment of the invention, given by way of example.

Referring to FIG. 5 a process for message generation will now be described which takes into account the fact that messages may be lost. The numbers in boxes correspond to the arrows in FIG. 3. Initially at step 500 the input Pi is received and then queued by means of a process or known as a daemon. These daemons are generally referred to in accordance with the present invention as message generator modules. These message generator modules will then generate messages Mi(j) for onward transmission to a target at step 502. Data relating to P-Key-Order and the target (j) is retrieved from the database and locked in step 504. All lines containing a P-Key are locked in the database until transmission occurs. This enables coherent reading of the database and prevents concurrent updates on the sequencing data. At step 506 sequence analysis is carried out to compute the sequence of the messages. This process will be described in greater detail with reference to FIG. 6. At step 508 the database is updated in those rows corresponding to those that were earlier retrieved in step 504 and the lock is released. This update of the rows identifies the dependencies of the messages and ensures that the rows are updated with the correct sequencing values.

At step 510 a determination is made as to whether a message is ready to be sent. If yes, the status of the message is set to N at step 512. This means that the message has no dependency and can immediately be queued for transmission to the external system at step 514. If the answer at step 510 is no, the dependency of the message is determined at step 516. A message is ready to be sent whenever it is a First of sequence (real first message or message received outside the 'active window'); or the previous message has been successfully sent. A database history is maintained for a specific time window in order to reduce the amount of space required. The specific time value can be defined by the maximum distance between two messages that have "changed" place with one another. For example: Message 1 arrives at t1, Message 2 arrives at t0 with t0<t1. The specific time will be the theoretical maximum of (t1-t0) in a 'reasonable situation'. The reasonable situation depends on the system. In a normal situation, Message 2 should wait for the arrival of Message 1. However, after having reached the specific time Message 2 may be declared free from its dependency on Message 1. If a dependency is identified the status is updated to D with the relevant dependency identifier. This is shown in step 518. The status D indicates that there is a dependency between the present message and another. Thus, in order to send the present message an acknowledgement must have been received from the message on which the present message depends. If at step 516 no dependency is identified (i.e. a previous message has not been received) the status is set to U at step 520. Status U stands for unknown. In this status, messages cannot be sent as no dependency has yet been computed. If the message status is U, the message is then inserted into a timer at step 522. This timer delays the message thereby allowing time for further inputs to be received which may enable a dependency of the message to be determined in a subsequent analysis as described above.

Figure 6:
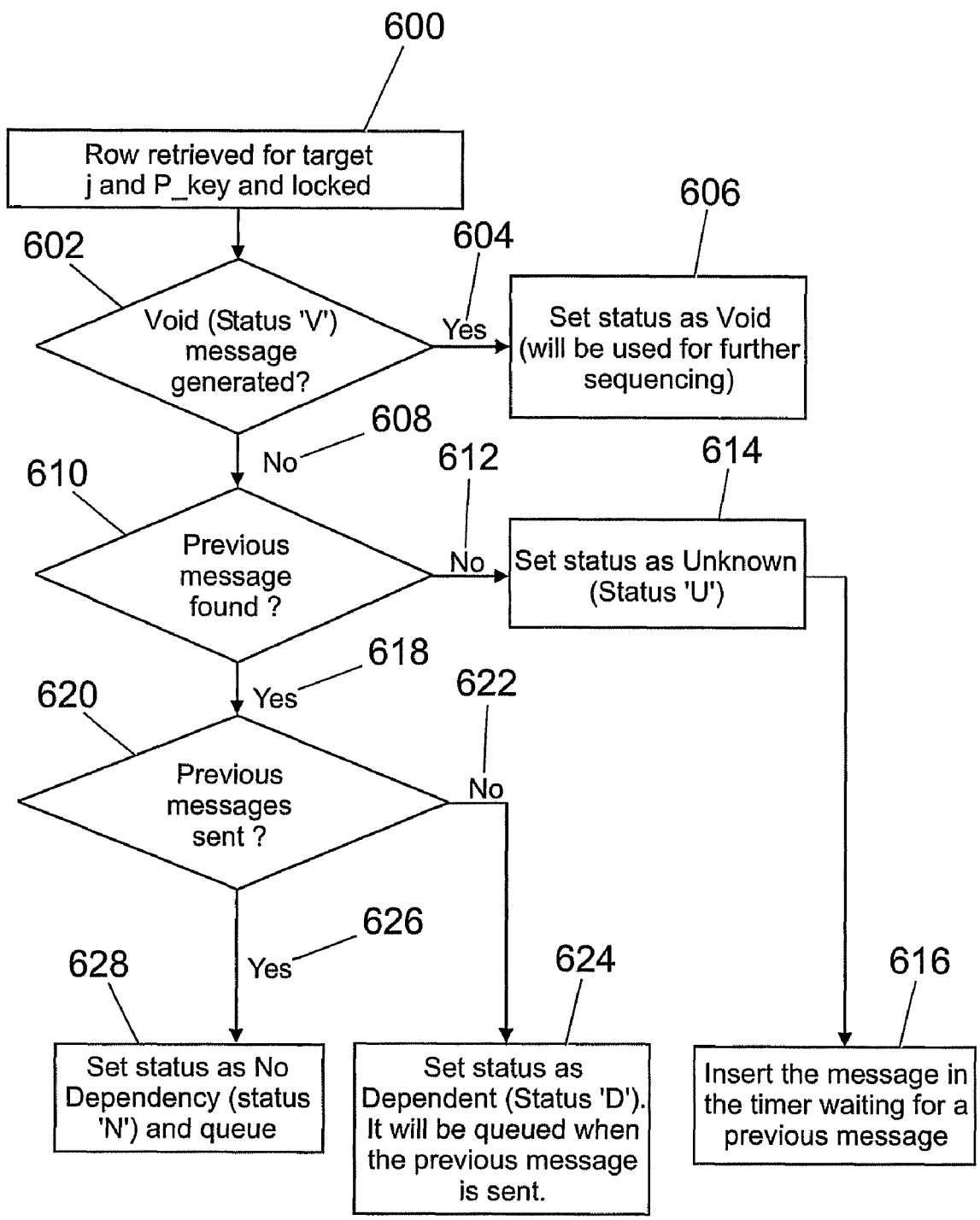
FIG. 6 is a flow chart showing the compute sequence for a message, in accordance with an embodiment of the invention, given by way of example.

Referring to FIG. 6 the steps associated with computing the sequence of messages will now be described. At step 600 the relevant rows are retrieved in respect of target j and P-Key-Order from the persistent database table and are locked. At step 602 a determination is made as to whether a void status message is generated. If yes (604) the status of the message is set as void at the step 606. If no void messages are generated (608) a determination is made as to whether or not there are previous messages at step 610. If there are no previous messages (NO, 612) the status of the message is set to unknown (status "U"). At this point, (step 616) the message is inserted into the timer to await the arrival of the previous message. If there is a previous message at step 610 (YES, 618) a determination is made as to whether or not the previous message has been sent at step 620. If the previous message has not been sent (NO, 622) the status of the message in question is set to be dependent (D) and is queued when the previous message is acknowledged as sent, as shown in step 624. If the previous message has been sent (YES, 626) the status of the message is set as not dependent (N) and queued for onward transmission at step 628.

Figure 7:
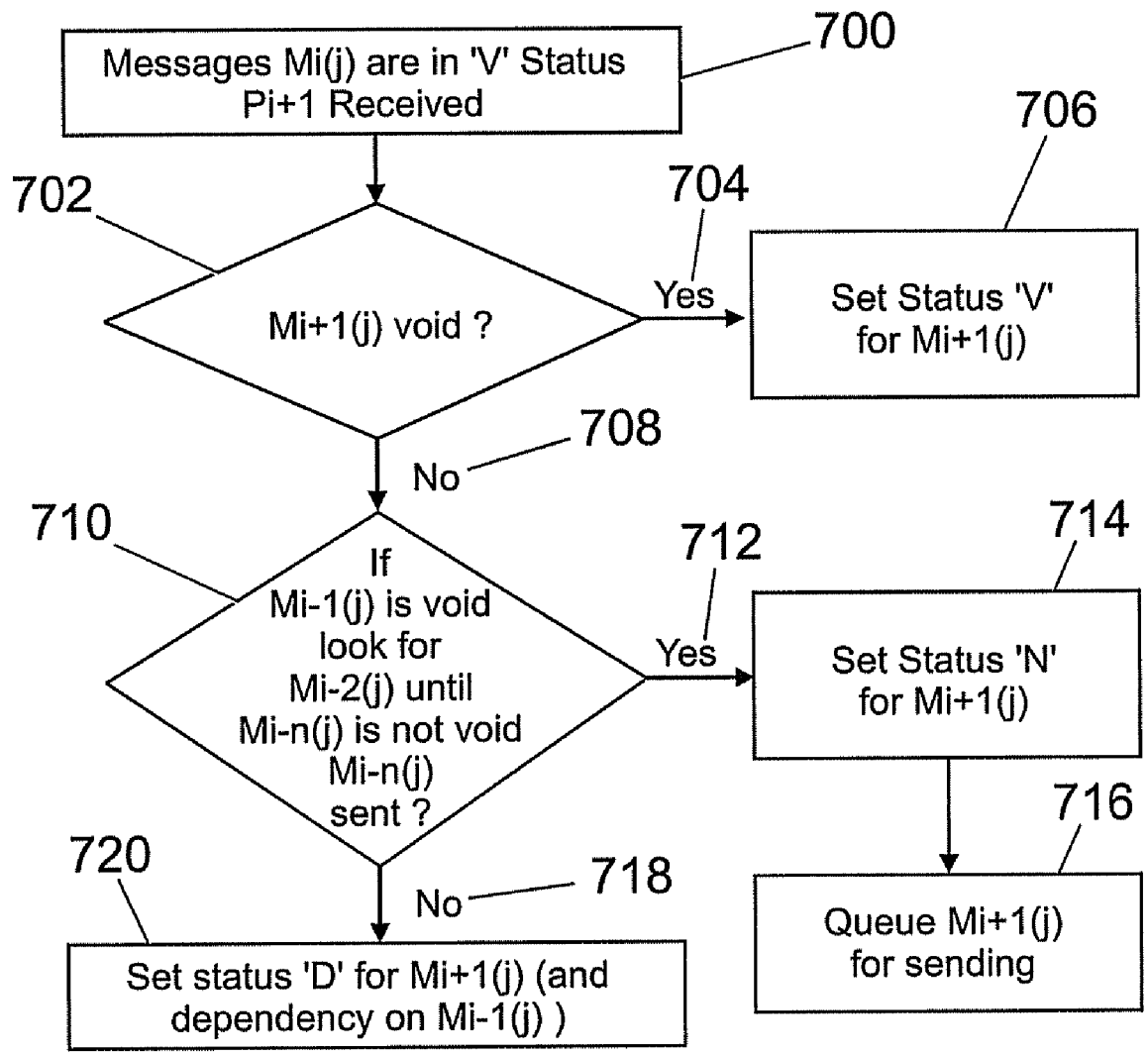
FIG. 7 is a flow chart showing the "V Status" for a message, in accordance with an embodiment of the invention, given by way of example.

Referring to FIG. 7, the special sequencing V or void will now be described. A void message is one which may not need to be sent but is in fact used in the database to avoid holes in the sequence numbers of the messages. Assuming a message, for example Mi(j) is in the void status and Pi+1 is received, as shown in step 700 a determination is made as to whether and not Mi−1(j) is void at step 702. If yes (704) the status for message Mi+1(j) is set to void, as shown at step 706. If no (708) the process moves on to step 710. At step 710 a determination is made as to whether message Mi−1(j) has been sent. If yes (712) the status of the message Mi+1(j) is set to N as shown in step 714. Then at step 716 message Mi+1(j) is queued for sending. If at step 710 the determination is no (718) the status of the message Mi+1(j) is set to D, with the dependency based on Mi−1(j). The various steps described above may be carried out on an incoming message or a delayed message that has been in the timer. Once a message has been queued for transmission, on reception of the acknowledgement, a second part of the process involving cascading and sequencing call-back occurs. This is shown in FIG. 8 and once again the figures in boxes correspond with the arrows in FIG. 3. At step 800 message Mi(j) has been sent to the client and an acknowledgement has been received. A determination is made as to whether message Mi(j) has any dependencies at step 802. If yes (804) a hypothesis is made that Mi+n(j) depends upon message Mi(j) at step 806. Then the dependency of message Mi+n(j) is updated to status N and the status of message Mi(j) is updated to status S. At step 808, message Mi+n(j) is queued for transmission to the client. Then at step 810 the status of message Mi(j) is set to S.

It should be noted that once a message is queued to be sent there is no need to further check the status of the message until an appropriate acknowledgement or other action occurs.

After a message has been sent acknowledgement is not always required for the process to continue. This process (of sending the message and waiting for the answer) can be either synchronous or asynchronous. The present invention is illustrated by means of a single message management module and database, however the invention could be implemented on a multiple message management modules and databases; although this may lead to greater complexity for the system.

FIG. 9 shows an example of part of a table of dependencies which in turn forms part of the persistent table in the database. The table presents a numerically increasing identification code in column 900; a P-Key-Order in column 902; the ordered tag (i) of the message in column 904; the target or client tag (j) in column 906; message status in column 908; message dependency in column 910 and the message itself in column 912. For a particular target for example j is 1, messages 9, 11, 13, 15 and 16 are relevant. However, message 16 is part of a different family based on the P-Key-Order and thus has no linkage with the other messages 9, 11, 13 and 15. Referring now to the messages from a common family (AAAAAA) the message with ID 9 is the first in the family as it has an index i of 0. This message has been sent as illustrated by the status S. The message with ID 11 is the next in the family but this message is void (status V) hence there is no message to send. The message with ID 13 has the status for no dependency (N) as the message with ID 9 has already been sent. This message (ID 13) is thus ready to send. The message with ID 15 has the status of D as it depends on the message with ID 13. Message 15 will be queued and sent once message ID 13 has been sent.

The database which includes the messages and information associated therewith is in the form of a persistent table. This table has an active window at any particular moment in time. The active window is that part of the table which is currently stored and active. For example, with reference to FIG. 9, the active window may be from ID 9 to ID16. Any messages in the table above this (i.e. ID0 to ID8) no longer need to be stored and can be deleted if required. Any information that is important has been used and processed as required. In the table the two families of messages both start in the active window. This is not necessarily the case. For example, the active window could move so that it starts at ID11, in this case ID9 and ID10 can be deleted. The messages which are dependant on ID9 and ID10 can no longer see ID9 and ID10 in the active window and so it is assumed that all messages on which a message is dependant have been sent if they are not in the active window. It will be appreciated that the active window will continue to change as messages come in and go out. The size of the active window is predetermined so that any messages which are out of sequence can arrive and their dependencies determined such that any unsent messages are held in the active window until such time as they can be legitimately sent. This may be a static value which is a hypothesis on the maximum time for waiting for a given late message. Example after n hours is Message Mi still waiting for Message Mi−1, if so this can be too late for Message Mi−1. So Message Mi will be processed as a 'first of sequence'. Here the active window is n hours. There is no need to keep more than n hours history. It is possible to decide whether an incoming message has to wait for a previous one based on a date/time of the incoming message Pi(j). The date/time corresponds to the creation date/time of message Pi−1(j).

The size of the active window can vary in any appropriate manner depending on, for example, the number of messages, system requirements, or other requirements.

Figure 10:
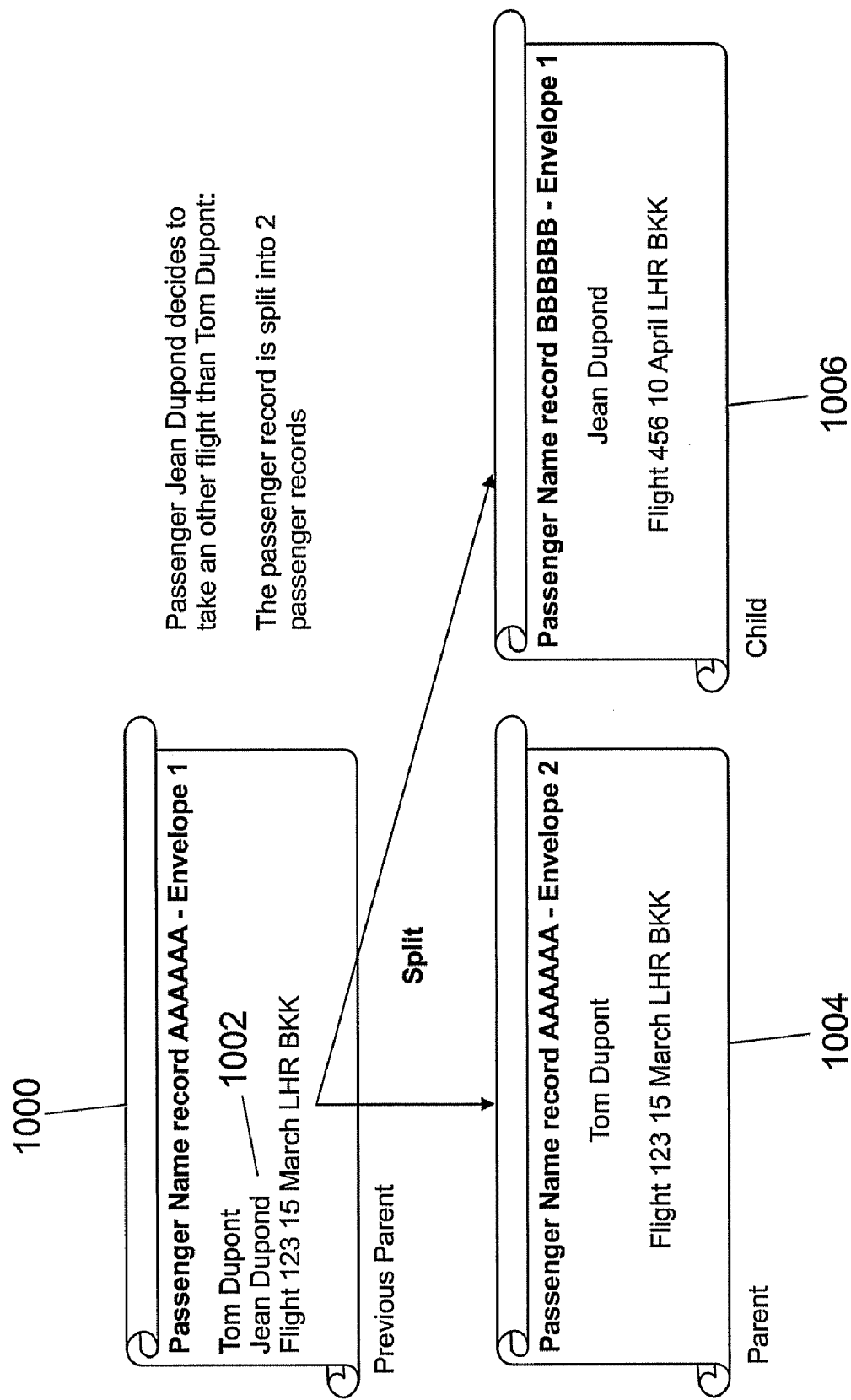
FIG. 10 is an example of a passenger name record envelope, in accordance with an embodiment of the invention, given by way of example.

In certain situations, a message may include information relating to more than one entity. For example, with respect to a passenger name record (PNR) there may be two passengers originally booked on a specific flight. If one passenger decides to change their flight the original message has to be split into two separate messages, which could then subsequently result in two different families of messages albeit that they are linked. FIG. 10 shows an example of such a situation. An original passenger name record is identified as 1000. At a certain point in time the second passenger Jean Dupond 1002 decides to take a different flight. At this point the message is split into two separate families 1004 and 1006, each with different P-Key-Orders, namely AAAAAA and BBBBBB respectively. The original passenger name record is often referred to as the previous parent, whilst the 2 newly generated messages are referred to as subsequent parent and child.

Figure 11:
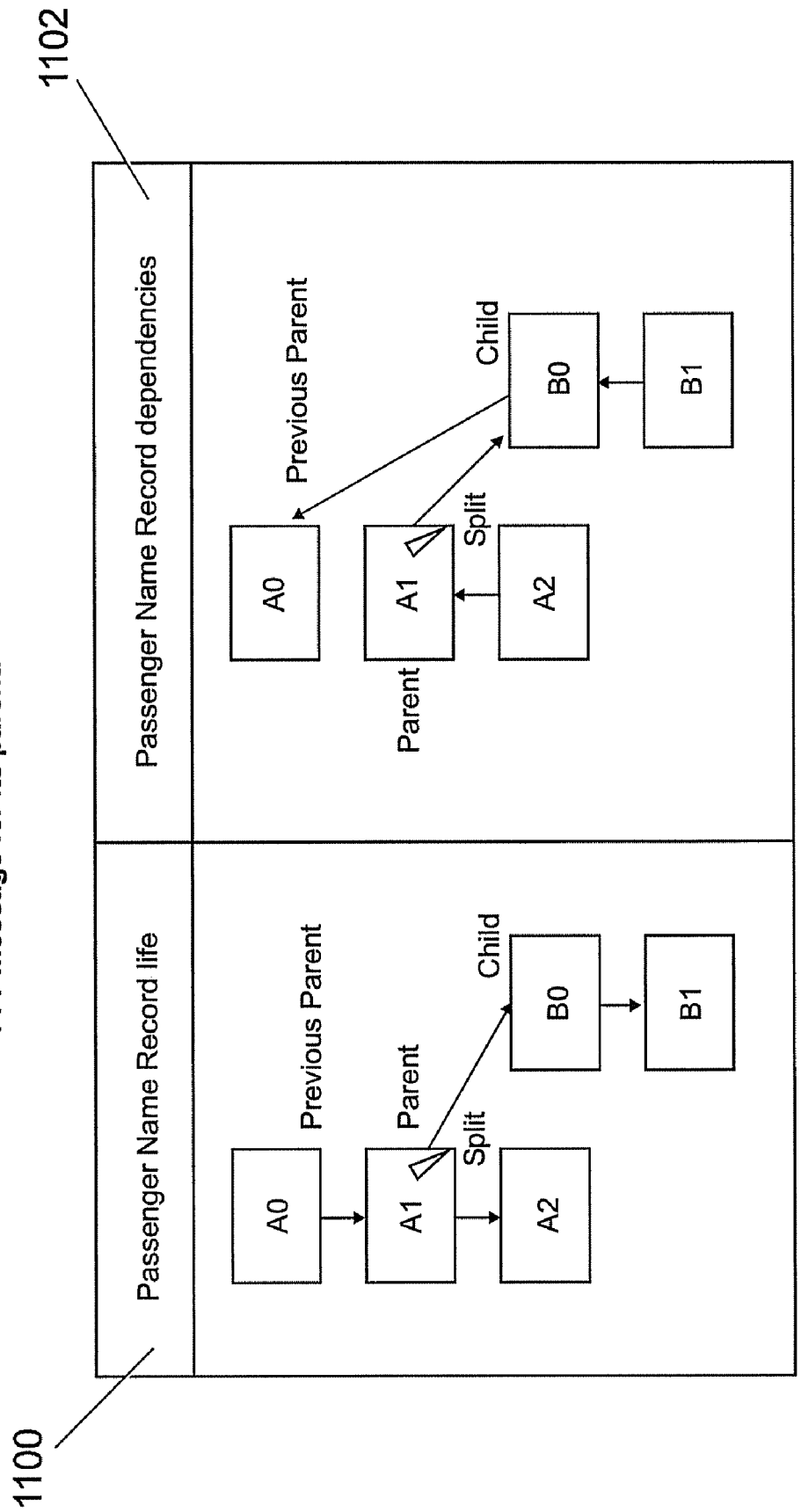
FIG. 11 is a flow chart showing the sequencing needs first split the case environment, in accordance with an embodiment of the invention, given by way of example.

FIG. 11 shows the sequencing needs, record details and record dependencies in the so-called split case, where a previous parent is split into a parent and child. On the left-hand side 1100, message A0 is split into message A1 and B0. A1 and B0 both have subsequent messages in their family of which one for each family is shown as A2 and B1 respectively. The right-hand side 1102 of FIG. 11 shows the dependencies of the different messages. B1 is dependent on B0, which in turn is dependent on A0 whilst A2 is dependent on A1 and A1 on B0.

Figure 12:
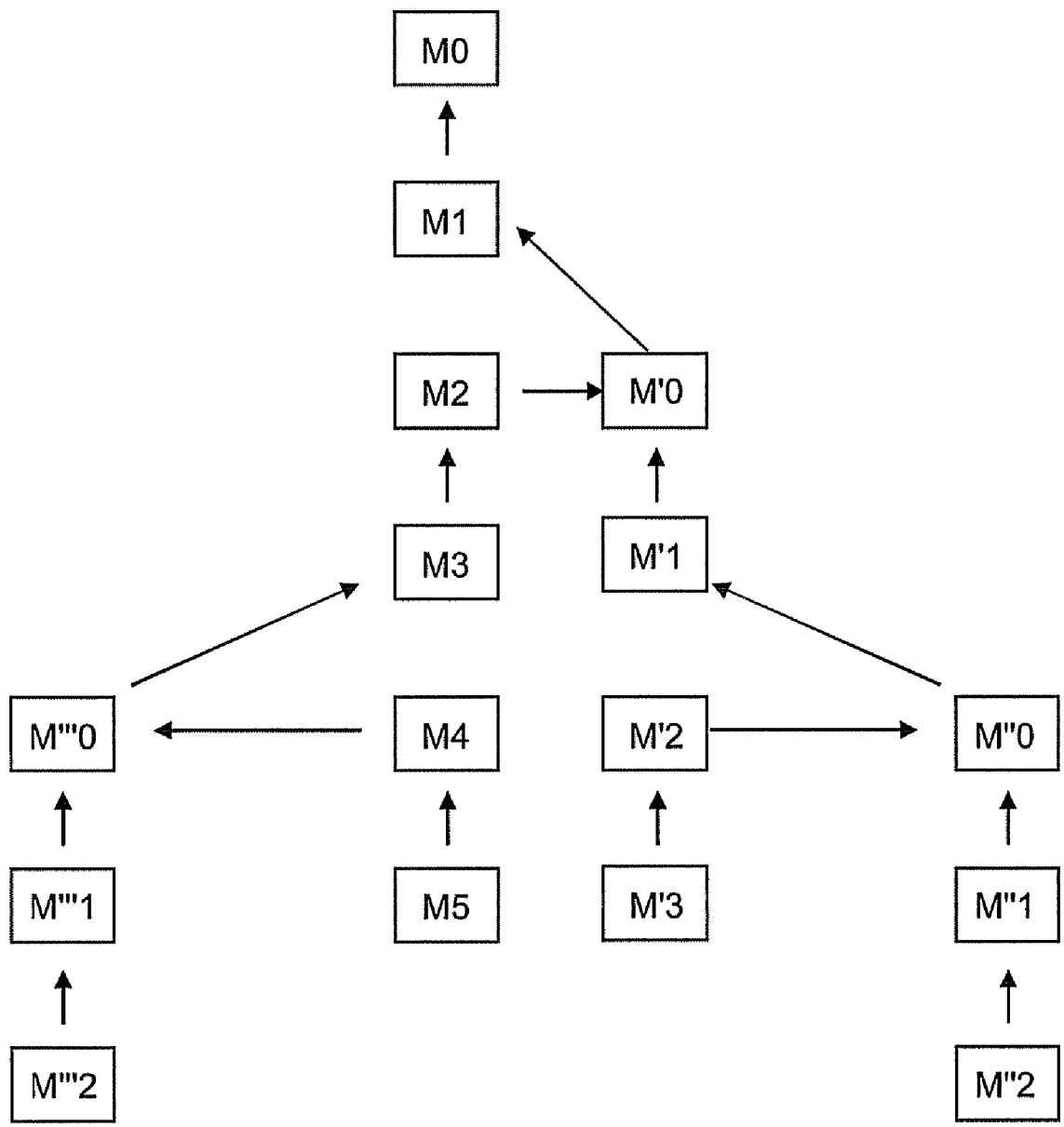
FIG. 12 is a dependency tree for a single target, in accordance with an embodiment of the invention, given by way of example.

The examples described above are based on simple message dependencies. However, often dependencies between different families of messages result in a complex relationship of dependency and in turn the required sequence of those messages. FIG. 12 is a dependency tree for a single target with different families of message. The figure shows different sequences of messages with different keys in other words from different families. The different keys are denoted by M, M', M" and M"' and a specific order for the messages in each family is defined by the associated numeral. The target or client notation has been removed to simplify the chart. As illustrated, M', M" and M"' contain a reference to their parent, message M and therefore a dependency exists and the different families of messages are aware of this. In the figure an arrow indicates that a message depends on another one. For example, M'2depends on M"0.

One feature of the present invention is to store a historic record of incoming messages in a database for a predetermined period of time. This predetermined period of time depends on the maximum interval of time needed to reorder messages that are out of order. If a message is determined to the independent from any other messages the predetermined period of time can be overlooked.

This invention has been described with reference to the purchase of tickets in the travel environment. However, it will be appreciated that the invention may apply to other environments, for example any multi-processing messaging environment, e.g. banking.

It will be appreciated that this invention may be varied in many different ways and still remain within the intended scope and spirit of the invention.

What is claimed is:
1. A method of ordering a plurality of messages received from a sender to be sent to a receiver in a sequence based on the dependency of one message on one or more other messages, the method comprising the steps of:
    receiving one or more messages from a stream of messages;
    generating one or more messages from the stream of messages and determining an order, a target and a value for a status field for each of the generated messages;
    storing the generated messages in a database;

identifying a characteristic (P-Key-Order) of each message which is common to a group of the stored messages;

identifying a message dependency for the stored messages in the group of messages from a parameter of the message;

reviewing a particular stored message in the database to determine if the stored message can be sent by:

determining whether the stored message is dependent on a previous message and determining a status of the previous message by reading a value of the status field of the previous message; and updating the value of the status field of the stored message based on the status of the previous message; and sending the stored message after acknowledgement that the previous message has been sent.

2. The method of claim 1, further comprising delaying the stored message until a predetermined condition is met.

3. The method of claim 1, further comprising delaying the stored message until a time delay is met.

4. The method of claim 1, wherein the step of determining whether a previous message exists comprises receiving a message acknowledgement that the previous message has been received by a recipient.

5. The method of claim 4, further comprising sending the stored message to an outbound queue.

6. The method of claim 4, further comprising updating the value of the status field of the stored message to thereby update the value of the status field of nay subsequent messages associated with the stored message.

7. The method of claim 1, further comprising sequentially repeating the reviewing, updating and sending steps for each message in the group of messages.

8. The method of claim 1, further comprising updating the database with any changes in status.

9. A message system for ordering a plurality of messages without a sequence identifier received from a sender to be sent to a receiver in a sequence equivalent to a message order of the plurality of messages, the system comprising:

a receiver module embodied in a non-transitory computer readable medium and for receiving one or more messages from a stream of messages and for generating one or more messages from the stream of messages and determining an order, a target and a value of a status field for each of the generated messages, and storing the generated messages in a database;

a message management module embodied in the non-transitory computer readable medium and for identifying a characteristic (P-Key-Order) of each message which is common to a group of the stored messages; for identifying a sequence which corresponds to the message order (1, 2, 3, 4 etc.) for the group of messages from a parameter of the message; and for reviewing a particular stored message in the database to determine if the stored message can be sent by employing:

means for determining whether a previous message exists in the sequence before the stored message and determining a status of the previous message by reading a value of the status field of the previous message; and means for updating the value of the status field of the stored message based on the status of the previous message; and a transmission module embodied in the non-transitory computer readable medium and for sending the stored message in accordance with the sequence once the previous message has been sent.

10. The system of claim 9, further comprising a delay module for delaying the stored message until a predetermined condition is met.

11. The system of claim 9, further comprising a time delay module for delaying the stored message until a time delay is met.

12. A non-transitory computer readable medium encoded with a computer program having instructions which when executed causes a computer to carry out a method of ordering a plurality of messages received from a sender to be sent to a receiver in a sequence based on the dependency of one message on one or more other messages, the method comprising the steps of:

receiving one or more messages from a stream of messages;

generating one or more messages from the stream of messages and determining an order, a target and a value for a status field for each of the generated messages;

storing the generated messages in a database;

identifying a characteristic (P-Key-Order) of each message which is common to a group of the stored messages;

identifying a message dependency for the messages in the group of messages from a parameter of the message;

reviewing a particular stored message in the database to determine if the stored message can be sent by:

determining whether the stored message is dependent on a previous message and determining a status of the previous message by reading a value of the status field of the previous message; and updating the value of the status field of the stored message based on the status of the previous message; and sending the stored message after acknowledgement that the previous message has been sent when said computer program is executed on a programmable apparatus.

\* \* \* \* \*